United States Patent [19]

Klein et al.

[11] Patent Number: 4,779,762
[45] Date of Patent: Oct. 25, 1988

[54] METHOD AND APPARATUS FOR CONTROLLING THE GAS CONTENT OF DISPENSED HOT MELT THERMOPLASTIC ADHESIVE FOAM

[75] Inventors: Richard G. Klein, Avon Lake; James W. Schmitkons, Lorain; Laurence B. Saidman, Westlake, all of Ohio

[73] Assignee: Nordson Corporation, Amherst, Ohio

[21] Appl. No.: 885,960

[22] Filed: Sep. 12, 1986

Related U.S. Application Data

[63] Continuation-in-part of Ser. No. 615,218, May 30, 1984, abandoned.

[51] Int. Cl.⁴ ............................................. B67D 5/08
[52] U.S. Cl. ....................... 222/52; 222/133; 222/190; 73/861.71; 73/19; 137/4; 137/88; 366/132; 366/151; 239/61; 422/62; 422/111; 425/145
[58] Field of Search .................. 73/861.71, 19; 137/4, 137/88; 366/132, 151; 239/61; 422/62, 111; 222/52, 63, 56, 57, 133, 145, 318, 255, 190; 425/135, 145

[56] References Cited

U.S. PATENT DOCUMENTS

| | | |
|---|---|---|
| 3,545,650 | 12/1970 | Williams . |
| 3,745,735 | 8/1973 | Hoyle et al. . |
| 3,835,885 | 9/1974 | Kreyenberg . |
| 4,050,896 | 9/1977 | Raffel et al. ............................. 73/19 |
| 4,059,466 | 11/1977 | Scholl et al. . |
| 4,059,714 | 11/1977 | Scholl et al. . |
| 4,154,537 | 5/1979 | Kress ................................. 366/151 |
| 4,200,207 | 4/1980 | Akers et al. ......................... 222/190 |
| 4,227,409 | 10/1980 | Bingler . |
| 4,301,119 | 11/1981 | Cobbs, Jr. et al. . |
| 4,371,096 | 2/1983 | Scholl et al. . |
| 4,376,172 | 3/1983 | Belangee et al. . |
| 4,405,063 | 9/1983 | Wydro et al. . |
| 4,535,919 | 8/1985 | Jameson ........................... 222/190 |

FOREIGN PATENT DOCUMENTS

59603 9/1982 European Pat. Off. .

Primary Examiner—H. Grant Skaggs
Attorney, Agent, or Firm—Wood, Herron & Evans

[57] ABSTRACT

A method and apparatus for controlling the gas content of dispensed hot melt thermoplastic adhesive foam. Air or another relatively inert gas is mixed with molten thermoplastic adhesive, and the mixture is pressurized to form a gas and molten adhesive "solution". When the molten adhesive and gas "solution" is dispensed at atmospheric pressure, the gas is released from "solution" and becomes entrapped in the adhesive in order to form a homogeneous closed cellular adhesive foam. In order to control the gas content of the dispensed adhesive and gas "solution", in accordance with one preferred embodiment, the pressure drop across a restriction in the flow path of the solution is sensed, and a control circuit controls the addition of gas to the adhesive to maintain the sensed pressure drop at a desired level. Other sensing techniques can be used to measure a parameter of the dissolved gas/molten adhesive single phase liquid solution which is correlated to the dissolved gas content of the solution and substantially independent of the molten adhesive content thereof, such as measuring the transmittance of infrared radiation through the gas-/adhesive single phase solution at a wavelength relatively heavily absorbed by the gas and unabsorbed by the adhesive.

48 Claims, 6 Drawing Sheets

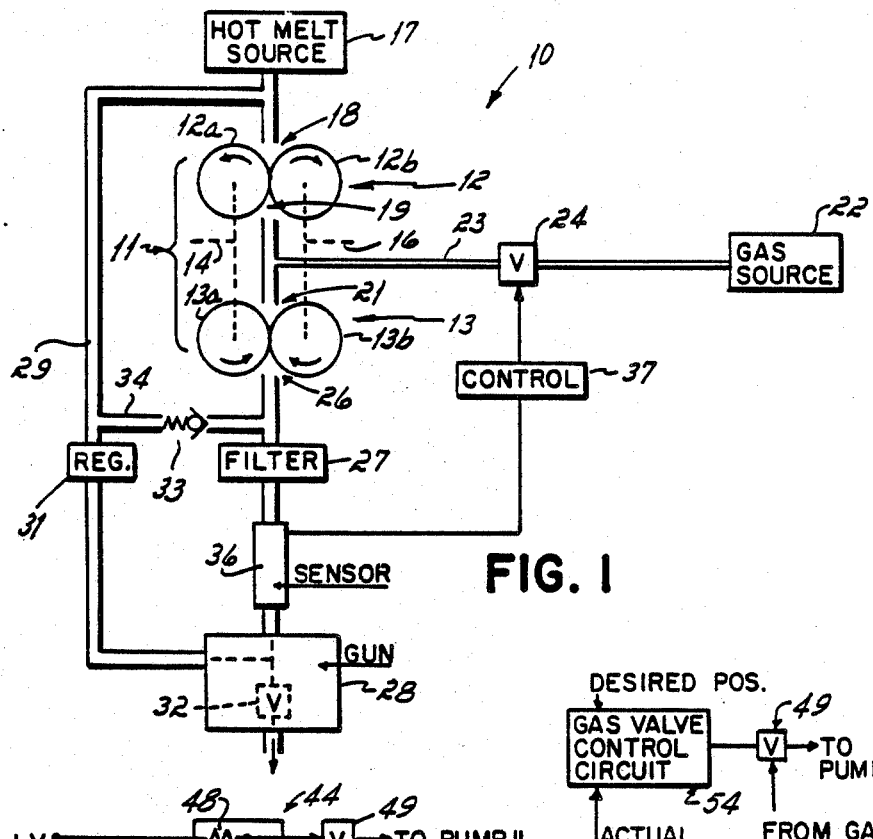
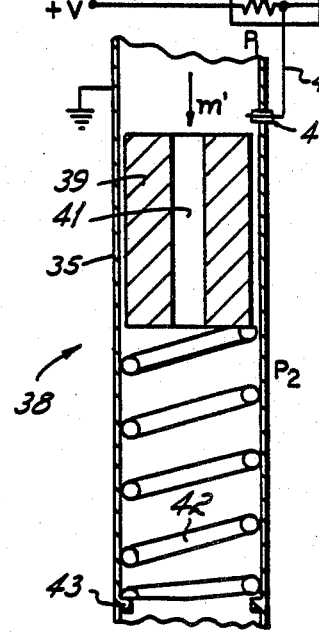
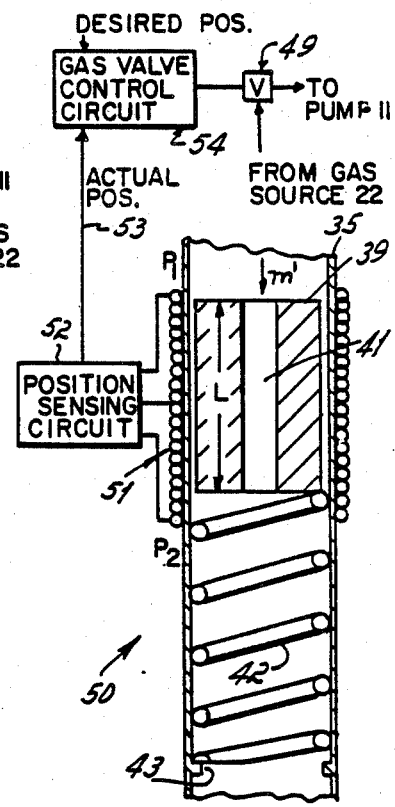
FIG. 1
FIG. 2
FIG. 3

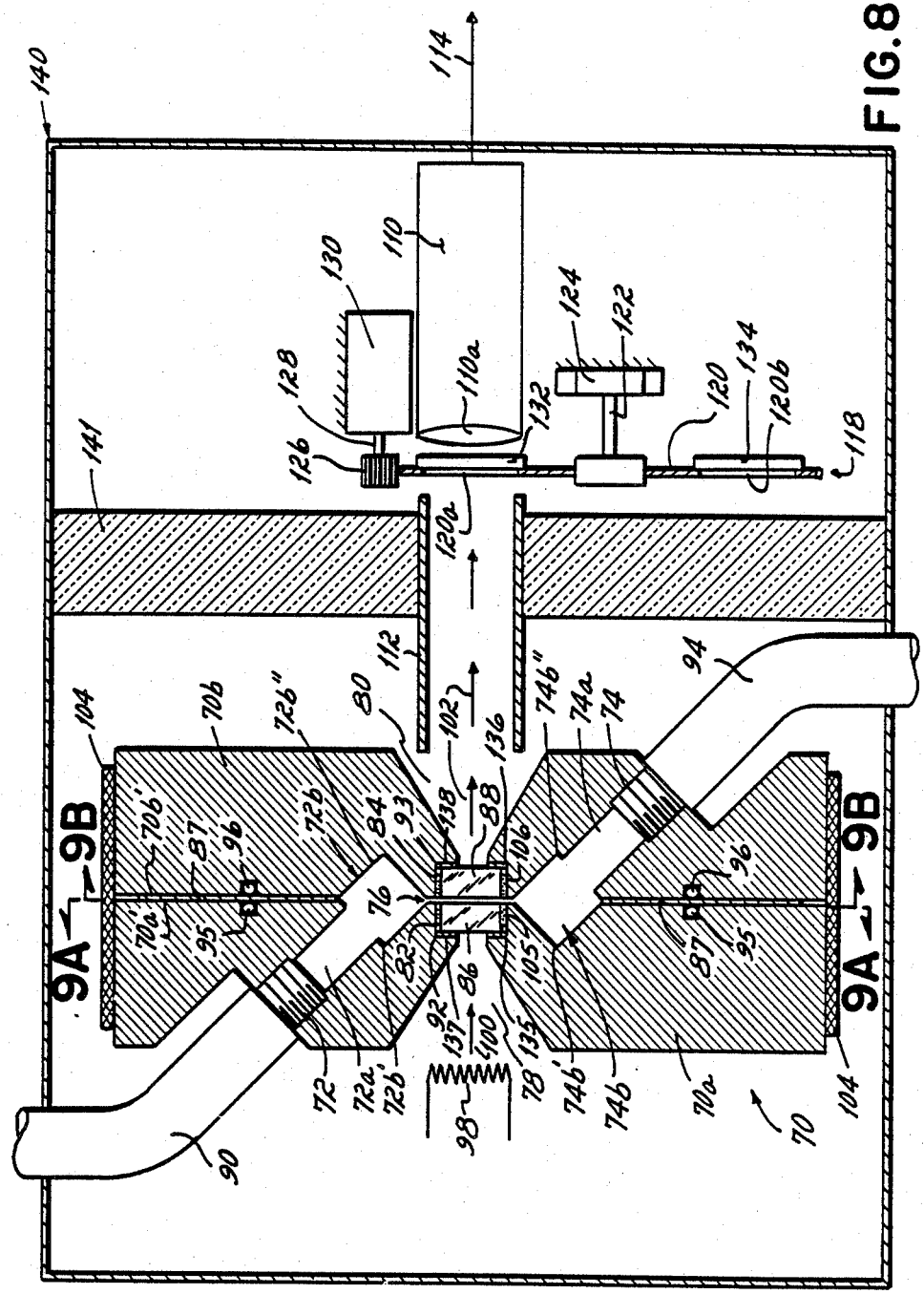

METHOD AND APPARATUS FOR CONTROLLING THE GAS CONTENT OF DISPENSED HOT MELT THERMOPLASTIC ADHESIVE FOAM

This application is a continuation-in-part of U.S. patent application Ser. No. 615,218, filed May 30, 1984, entitled METHOD AND APPARATUS FOR CONTROLLING THE GAS CONTENT OF DISPENSED HOT MELT THERMOPLASTIC ADHESIVE FOAM, invented by Richard G. Klein and James W. Schmitkons, now abandoned.

This invention relates generally to hot melt thermoplastic adhesive dispensing systems and, more particularly, concerns systems for dispensing hot melt thermoplastic adhesive foam. The invention is more specifically related to such systems in which the gas content of the hot melt adhesive foam is controlled.

Hot melt thermoplastic adhesives are used in a number of applications such as packaging and product assembly. If the hot melt adhesive is applied as a cellular foam rather than as a non-foamed adhesive, certain improved characteristics are obtained, such as increased bonding strength and a longer "open" time during which the adhesive retains its bonding strength after being applied to a substrate. The details of a number of hot melt thermoplastic adhesive foam systems are set forth in U.S. Pat. Nos. 4,059,466 to Scholl et al, 4,059,714 to Scholl et al, and 4,200,207 to Akers et al, all commonly assigned herewith.

In an exemplary foamed hot melt adhesive system, a dual stage gear pump supplies an adhesive and gas solution to an adhesive dispenser, or gun. The gun contains a valve at an outlet nozzle through which the solution is dispensed to atmospheric pressure. When the solution is dispensed, the gas is released from solution to become entrapped in the adhesive to form a foam on a substrate to which the adhesive is applied.

In the foregoing description, and throughout this specification and the claims, the term "solution" is used to describe the liquid adhesive/gas dispersion supplied under high pressure to the gun, which dispersion when dispensed from the gun at atmospheric pressure cools and creates a foamed adhesive. The applicants are of the view that this mixture is a true solution in which the molecules of the dissolved gas are dispersed among those of the liquid adhesive. The term "solution", though, as used in the specification and the claims of the application is intended to encompass the broader generic definition of solution which is a gas homogeneously mixed with the molten liquid adhesive, whether or not the molecules of the dissolved gas are in fact dispersed among those of the solvent.

In the above-mentioned exemplary dual stage gear pump system, adhesive is supplied from a hot melt adhesive source to the first stage of the gear pump, and a suitable gas, such as nitrogen, carbon dioxide, or air, is introduced at the inlet of the second stage of the pump together with the adhesive discharged from the first pump stage. Typically, the pump capacity of the second stage is greater than that of the first stage, such as by a factor of 50%, so that the gas is substantially drawn into solution with the adhesive. When the adhesive and gas solution is output from the second pump stage, it is coupled to the gun for dispensing through the gun valve.

In order to permit continuous operation of the pump, and to facilitate homogeneous mixing of the gas with the adhesive, when the gun valve is closed, the adhesive and gas solution is recirculated from the gun back to the inlet of the first pump stage. Preferably, when the gun valve is open for dispensing the adhesive and gas solution, a portion of the solution (such as 75%, for example) is recirculated. New raw adhesive is introduced at the first pump stage inlet as necessary to replace adhesive dispensed from the gun. A recirculation valve is present in the recirculation loop in order to establish the degree of recirculation. In one form of foamed hot melt system, the recirculation valve is a pressure regulator which maintains the adhesive and gas solution at the gun at a constant pressure.

In the above-described system, if the adhesive and gas solution is recirculated for a period of time with the gun valve closed, gas continues to be introduced into the adhesive, so that the gas content of the adhesive increases. If the gas content of the adhesive and gas solution is allowed to increase without limit, the quality of the foamed adhesive from the dispensing gun can become unacceptable. In some cases, during dispensing of a very high gas content adhesive solution, as may be released from the adhesive at the nozzle causing sputtering.

In order to avoid the problems caused by the presence of excess gas in the hot melt adhesive and gas solution, it has been proposed to control a gas valve in the gas line between the gas supply and the adhesive pump. This control valve is turned off whenever the gun is turned off, stopping the flow of gas to the pump.

The gas content of the adhesive and gas solution decreases, however, when the system is in a strictly recirculation mode, with the gun valve and the gas valve closed, due apparently to gas leakage from the pump, such as along the pump shafts and at the inlet to the first pump stage. It has, therefore, also been proposed in the past to open the gas valve occasionally when the gun is off for extended periods of time in order to keep the gas content of the solution from becoming too low.

In this prior control system, which is disclosed in the commonly assigned U.S. Pat. No. 4,405,063 to Wydro et al, the gas valve is also opened during initial start-up of the foamed hot melt adhesive system, such as for the first two or three minutes of system operation.

This prior approach to controlling the gas content of the adhesive and gas solution suffers from the drawback that the gas flow is controlled only to an approximation of the amount necessary to produce foamed adhesive of proper quality. Further, even if the quality of such a system is acceptable in steady state conditions, this prior approach does not deal with the difficulties of initializing the hot melt system each time it is operated from a cold start-up condition. Typically, with such a prior system, the operator of the foamed adhesive dispenser must adjust, by observation, various system parameters to obtain the proper foaming of the adhesive which is dispensed from the gun. For example, the operator may have adjustments for setting the gear pump drive, controlling the cycling of the gas valve, setting the pressure drop of the recirculation valve, and regulating the gas flow rate and pressure. Since adjusting any of these parameters affects the other parameters, initial setup of such a foamed hot melt system can require several iterations of adjusting the various system parameters before the desired quality of hot melt foam is obtained.

It is consequently an object of the present invention to provide a foamed hot melt adhesive system in which the gas content of the adhesive and gas solution is controlled to provide a readily obtainable good quality of dispensed foamed adhesive. It is a related object of the invention to provide such a system in which the setup procedure permits arriving at the optimum quality foamed adhesive easily and accurately.

While initially it would appear that measurement and control of the gas content of the adhesive and gas solution is relatively straightforward, this is not the case. The hot melt adhesive and gas solution supplied from the adhesive pump outlet to the gun is typically at a high pressure, such as in the range of 800–1,500 psi, and the gas is forced into solution with the adhesive. Due to the pressures involved, a straightforward densitometer reading of the adhesive and gas solution coupled from the pump to the gun yields density values which vary only a very small amount over a fairly large range of variations in the gas content of the solution. Stated differently, extremely small changes in density of the gas/molten adhesive solution can produce very large changes in foam density when the gas/molten adhesive solution leaves the dispenser and converts to foam as the gas comes out of solution.

In practice it has been found that a "foam ratio" of 2–2.5 is desirable, where:

foam ratio =

$$1 + 828 \frac{\text{mass of gas/unit volume of solution}}{\text{mass of adhesive/unit volume of solution}},$$

where the constant, 828, represents the value for A-3 adhesive at atmospheric pressure and 350° F. If, for example, a foam ratio of 2.0 is desired, the percentage of gas in the combined gas/adhesive foam will be approximately 0.12%. Thus, it is clear that the contribution of the gas, from a mass standpoint, to the combined mass of the gas/adhesive foam is very, very small. As a consequence, if one looks at the density of the gas/adhesive solution, that is, as it leaves the pump and is still under very high pressure to produce a single phase unfoamed liquid, in an effort to detect variations in density thereof for the purpose of controlling the percentage of gas in the gas/adhesive solution (and ultimately the foam ratio), it would not be feasible to make a densitometer sufficiently sensitive to detect variations in the gas content thereof. Thus, it is clear that direct measurement of the density of the gas/adhesive solution (pressure sufficiently high that have substantially single liquid phase with substantially all gas dissolved in molten adhesive) is not a realistic solution from a practical standpoint.

Unfortunately, it is not practical, if not virtually impossible, to monitor the density of the foam as it is dispensed from a hot melt dispenser. While foaming starts in the nozzle of the dispenser, it is not complete until it is deposited in bead form on the surface of the product to which it is being applied. Since the product is often moving at high speed, such as a cereal box top flap moving along a high speed conveyor, it is not really possible to monitor the density of the foam bead deposited on the moving box flap. In other cases, such as in making foam gaskets, the foam is deposited into a channel provided in the surface of the product in which the gasket is formed. It is difficult, if not impossible, to monitor the density of foam located in a channel formed in a product.

As a result of the difficulties in measuring density directly, and in accordance with one aspect of the present invention, in the present foamed hot melt system a measurement is made of a parameter other than density whose value is indicative of the gas content of the adhesive and gas solution. More particularly, this invention solves the problem of dispensing uniform density foam, which is a two phase mixture of gas and liquid adhesive, by measuring a parameter of the single phase gas/molten adhesive solution, other than the density thereof, which is correlated to the dissolved gas present in the single phase unfoamed gas/molten adhesive solution and substantially independent of the molten adhesive content thereof. Thus, the density of the unfoamed gas/molten adhesive solution is not measured, but rather some other parameter, such as flow rate of the unfoamed solution, the transmittance of infrared radiation through the unfoamed solution at a wavelength heavily absorbed by the gas and relatively unabsorbed by the adhesive, which is correlated to the dissolved gas present in the unfoamed single phase gas/molten adhesive solution. Also, not measured is the density (or any other parameter) of the gas/molten adhesive in its foamed condition which exists at low pressure when the gas comes out of solution with the molten adhesive to give a two phase mixture of gas and molten adhesive.

In accordance with a preferred form of the invention, a measurement is made, in the flow path between the pump outlet and the gun, of the pressure drop due to the flow of the solution through a restricted orifice in a movable slug in this flow path. This pressure drop is proportional to the mathematical product of (a) the mass flow rate of the solution from the pump and (b) the viscosity of the solution.

As will be explained hereafter, the mass flow rate and the viscosity of the solution from the pump are inversely proportional to the percentage of gas in the solution and consequently the product of these two quantities is also inversely proportional to the gas content. Therefore, the differential pressure which is measured across the restricted orifice slug has a determinable correlation to the gas content of the solution. This differential pressure is used to control a valve in the gas line from the gas source to the pump in order to control the addition of gas to the solution on a closed loop servo control basis. As the gas content of the solution falls, the pressure differential at the slug sensor increases, and a control circuit coupled to the sensor activates the valve in the gas line to add gas to the solution.

In a typical foamed hot melt system, the hot melt adhesive is supplied to the first stage of a two stage gear pump through gravity feed from a heated, unpressurized, adhesive tank. Consequently, the pressure at the inlet to the first stage of the gear pump is only slightly above atmospheric pressure. Since the adhesive and gas solution from the outlet of the second stage of the pump is recirculated to the first stage inlet, through a restriction device or pressure regulator, the pressure of the solution in the portion of the recirculation path from the regulator to the return inlet at the first stage of the pump is at a relatively low pressure.

In employing a pressure drop slug sensor as described above, it has been oberved that the predominant variable related to the pressure drop at the sensor is the mass flow rate of the adhesive and gas solution. Apparently the reason for this is that due to the low pressure in the recirculation path between the regulator and the inlet of the first pump stage, the recirculated adhesive is partially "foamed"; the gas is beginning to come out of solution due to the relatively low pressure at the pump inlet. Therefore, the amount of adhesive mass that is "bitten off" by the first stage of the gear pump is less than the amount which would be drawn in from a pure raw adhesive source. The first stage of the gear pump is, in effect, a metering stage since no more adhesive mass can be introduced through the pump than that introduced at the first stage inlet. Thus, and assuming constant pump speed, the mass flow rate through the gear pump, and exiting the second stage of the gear pump, decreases as the gas content increases. More gas can, however, be introduced at the inlet to the second pump stage.

As the percentage of gas in the hot melt adhesive and gas solution (exiting the second stage outlet of the pump) increases, the mass flow rate of the pump decreases, for a constant pump speed. The outlet pressure produced by the pump, such as in the above-mentioned range of 800–1,500 psi, is sufficient at the outlet of the second pump stage to maintain the gas in a compressed form in solution in the adhesive, and the density of the solution does not change substantially with changes in gas content. However, there is a variation in the mass flow rate of the pump which is produced by the metering action at the first stage where almost-"foamed" adhesive is recirculated to the first stage inlet. It is presently believed that, in observed forms of hot melt adhesive systems constructed in accordance with the present invention, the effect of the just-described flow rate variation upon the pressure differential at the slug sensor is about four to five times or more than the effect of viscosity changes.

Due to the employment of the pressure differential slug sensor in the presently illustrated hot melt system, the system can be readily set up for optimum foamed adhesive production regardless of lengths of time during which the gun valve is closed and the adhesive solution recirculated. To do this, the operator runs the system with the gun open to obtain a desired foamed adhesive output in an initial run, as selected by observation of the dispensed foamed adhesive. The pressure drop across the restricted orifice slug is measured and noted or electronically stored at this time. Subsequently, when the gun is off, a servo system coupled from the sensor to a gas line valve utilizes this stored pressure drop value to control the flow rate of gas into the solution in order to maintain the pressure differential at the optimum value stored earlier during dispensing of adhesive solution from the gun. The precise manner in which the gas valve is controlled is subject to choice. For example, an on/off system may be used wherein a reduction of the differential pressure across the slug beyond a certain amount results in activation of the gas valve to introduce more gas into the adhesive and gas solution at the inlet to the second pump stage. Alternatively, a proportional control may be used in order to minimize overshoot and undershoot about the selected differential pressure, which would otherwise be produced by "hunting" of the control.

It should be noted that when such a servo loop is employed for controlling the gas flow rate, the need for precise gas pressure regulation and gas flow rate measurement is eliminated. Since the gas flow rate control servo loop operates to provide the requisite gas content of the solution, regardless of the particular gas supply pressure or valve opening, there is no need to precisely measure the flow rate, for example, by using a precision meter.

The differential pressure at the slug sensor is affected not only by factors related to the gas content of the hot melt solution, but also by factors which are not so related. Variation of the pump speed alters the flow rate of the adhesive and gas solution in a manner generally unrelated to the gas content of the solution. Variation of the temperature of the solution alters the viscosity of the solution in a manner generally unrelated to the gas content of the solution.

In one version of the present invention, a closed loop system is provided in which the pressure drop across a restricted orifice slug is sensed on a continuous basis and in which the "set point" pressure drop is changed to a new optimum value if the pump speed or the adhesive temperature changes. One way to calibrate this type of system is to use a control circuit or microprocessor and to conduct one or more initial "teaching" runs to establish the operating parameters of the system. Thereafter, if the pump speed or the temperature should change, the control circuit calculates, or interpolates from a set of tabular values, the requisite "set point" differential pressure needed to maintain the gas content of the adhesive and gas solution at the desired level.

In initializing such a control system, the hot melt pump is operated at a certain speed, such as in a "fast" mode, and the pressure drop of the restricted orifice slug and the hot melt solution temperature are noted when the properly foamed hot melt adhesive is dispensed. The pump speed is than reduced to a "low" speed and a new pressure differential and adhesive temperature measured at this alternative operating condition. The two pump speeds and their related pressure drops are used to approximate a linear relationship of pressure drop versus pump speed. Based upon this approximated relationship, interpolation between the measued points can be used to select the appropriate "set point" pressure drop for other pump speeds.

The temperature of the hot melt solution changes when the pump speed changes due to the difference in required energy input into the hot melt solution to move the solution at the different flow rates resulting from the different pump speeds. For example, in some systems, a temperature differential attributable to a pump speed change in the range of 20°–25° F. has been observed.

There is a known exponential relationship between the viscosity of the adhesive and gas solution and the temperature of the solution. This relationship is taken into account in the present system to compensate for viscosity changes with temperature, and their consequent effect upon the pressure differential sensed by the restricted orifice slug sensor. Depending upon the degree of accuracy required, the pump speed versus pressure drop relationship may be adjusted based upon the known relationship between viscosity and temperature, or the effect of such viscosity changes may be approximated.

In accordance with a further embodiment of the invention, the sensor includes a source of infrared radiation having a specified wavelength substantially absorbed by the gas and substantially unabsorbed by the adhesive material, and a detector for detecting radiation at the specified wavelength emerging from the substantially single phase unfoamed gas/molten adhesive single phase liquid solution when irradiated by the IR source. Further included are sampling means defining a sample flow path for passing a sample of the substantially single phase unfoamed molten adhesive and gas solution between the infrared radiation source and detector. The sampling means preferably includes a body having inlet and outlet ports between which is connected an intermediate sample flow region. The intermediate sample flow region has a cross-sectional flow area defined by a width and by a height which is substantially smaller than the width to minimize the pressure drop across the intermediate sample flow region. The inlet and outlet ports and said intermediate sample flow region collectively comprise the sample flow path. The infrared radiation source passes infrared radiation along a radiation path through the intermediate sample flow path to the detector in a direction approximately parallel to the height thereof to maximize transmission of infrared radiation from the source through the intermediate sample flow region to the detector, enhancing the signal-to-noise ratio.

Preferably, the radiation path through the intermediate sample flow region has a width measured parallel to the width of the intermediate sample flow region cross-sectional area which is substantially less than, and approximately centered relative to, said width of said intermediate sample flow region cross-sectional area. This minimizes sampling errors due to effects at the edges of said intermediate sample flow region.

The sampling means further comprises a heater for heating the body to a temperature approximating the temperature of said molten adhesive material output from said adhesive supply means, and a pair of slightly spaced windows of solid state material transmissive to the infrared radiation located within the body along the radiation path on opposite sides of, and adjacent to, the intermediate sample flow region. The body has a substantial thermal mass to avoid rapid temperature changes adjacent the radiation windows to minimize the risk of subjecting the windows to thermal shock.

In practice, the windows and the body have significantly different coefficients of thermal expansion. A layer of resilient sealant resiliently mounts the windows in sealed relation to the body to accommodate thermally-induced dimensional changes between the body and windows, and seal the windows relative to the body to prevent seepage therebetween of the pressurized dissolved gas/molten adhesive single phase liquid solution flowing in the intermediate sample flow region.

Other objects and advantages of the invention, and the manner of their implementation, will become apparent upon reading the following detailed description and upon reference to the drawings, in which:

FIG. 1 is a diagrammatic illustration of an embodiment of an improved adhesive foam dispensing system in accordance with the present invention;

FIG. 2 is a diagrammatic illustration of a first pressure differential sensor for the system of FIG. 1;

FIG. 3 is a diagrammatic illustration of an alternative pressure differential sensor for the system of FIG. 1;

FIG. 8 is a vertical cross-sectional view of a still further embodiment of a sensor for measuring a parameter of the dissolved gas/molten adhesive single phase liquid solution which is correlated to the dissolved gas content of the solution and substantially independent of the molten adhesive content thereof.

Figure 4:
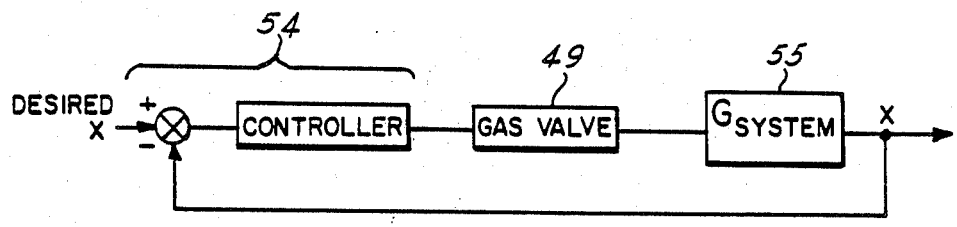
FIG. 4 is a diagrammatic illustration of a servo control loop for the system of FIG. 1.

While the invention is susceptible to various modifications and alternative forms, certain illustrative embodiments have been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

With initial reference to FIG. 1, a foamed hot melt adhesive dispensing system arranged in accordance with the present invention includes a two-stage gear pump 11 having a first stage 12 and a second stage 13. Each stage includes oppositely rotating and meshed gear pairs 12a, 12b, and 13a, 13b, respectively. The driven gears 12a, 13a of each stage are connected by a common drive shaft 14 and the idler gears 12b, 13b of each stage are connected by a common idler shaft 16. Molten hot melt adhesive is introduced from a hot melt source 17, typically by gravity feed at atmospheric pressure, into the low pressure inlet 18 of the first stage 12 of the gear pump. The adhesive is delivered at the outlet 19 of the first stage 12 at a metered rate, and the adhesive is introduced into the inlet 21 of the second stage 13 of the pump 11. Gas is supplied from a gas source 22 into the inlet 21 of the second stage 13 of the pump 11 through a gas line 23. The gas may be, for example, nitrogen, air, or carbon dioxide, and the gas is supplied in the line 23 through a gas valve 24, the operation of which will be described in more detail hereinafter.

The gas from the line 23 and the adhesive from the outlet 19 of the first pump stage 12 are intimately mixed in the second stage 13 of the gear pump 11. This mixing places the gas and the adhesive under such pressure that the gas goes into solution with the molten adhesive to provide a molten adhesive and gas solution. This solution is ejected from the outlet 26 of the second stage 13 of the pump 11 and coupled through a filter 27 to a valved adhesive dispensing gun 28.

A recirculation path 29 couples the adhesive and gas solution from the outlet 26 of the pump 11 to the inlet 18 of the first stage 12 of the pump. During normal operation of the system, the solution of adhesive and gas from the second stage outlet 26 is coupled through the filter 27 and the body of the dispensing gun 28, via a pressure regulator 31 and the recirculation line 29, to the inlet 18 of the first stage of the pump. The gun 28 includes a valve 32 which is opened and closed to dispense the adhesive and gas solution onto a substrate. A portion, such as for example 75%, of the solution is recirculated through the regulator 31 and the path 29 when the gun valve 32 is open, and the other 25% of the flow from the pump is dispensed through the gun. When the gun valve 32 is closed, all of the adhesive and gas solution from the outlet 26 of the pump 11 is recirculated through the recirculation path 29, with the pressure regulator 31 maintaining the pressure at the gun 28 at a substantially constant level in a range of, for example, 800–1,500 psi.

In the event of a blockage beyond the outlet 26 of the second stage 13 of the pump, such as in the filter 27 or the gun body 28, the resultant pressure buildup at the outlet 26 results in the opening of a pressure relief valve 33 in a pressure relief path 34 which couples the solution from the pump outlet to the recirculation line 29.

In accordance with the present invention, a parameter of the adhesive and gas solution is sensed and used to control the flow of gas through the valve 24. In the illustrated form of the invention, a sensor 36 is positioned in the flow path of the solution between the filter 27 and the gun 28. A control circuit, indicated generally as 37, is responsive to the sensor 36 to open and close the gas valve 24.

As shown in FIG. 2, in one illustrated form of the invention the sensor 36 takes the form of a transducer, or differential pressure measuring device, 38 in the flow line of the adhesive and gas solution. The device 38 includes a movable slug 39 positioned in the solution flow path and having an orifice 41 therethrough. The pressure drop across the slug 39 due to flow through the restricted orifice 41 is proportional to the gas content of the adhesive and gas solution. The transducer device 38 further includes a spring 42 for opposing movement of the slug 39 in the direction of flow of the solution. One end of the spring 42 bears against a suitable stop 43 in the flow conduit, and the other end of the spring 42 bears against the slug 39. At a constant flow rate, the position of the slug is a function of the pressure drop across it. This pressure drop is in turn a function of the gas content of the solution. Therefore, by monitoring the position of the slug, an indication of the gas content of the adhesive and gas solution is obtained.

In a steady state condition, there is a net force urging the slug 39 downwardly, as shown in FIG. 2, due to the pressure differential across the slug. In this steady state condition, the downward force is balanced by an opposing spring force produced by the compressed spring 42. Since the spring force increases with the compression of the spring 42, by an amount dependent upon the spring constant, the position of the slug 39 is indicative of the spring force, and of the opposite but equal force due to the pressure differential across the slug 39.

As shall be discussed in more detail hereinafter, as the gas content of the adhesive and gas solution increases, the pressure drop across the slug 39 decreases. As the pressure differential decreases, the slug 39 moves upwardly, as shown in FIG. 2, untensioning the spring 42 until the spring force again balances the force on the slug produced by the pressure differential.

This movement of the slug 39 dependent upon the pressure differential may be employed with a control system 44, as illustrated in FIG. 2, to regulate the gas content of the adhesive and gas solution. The control system 44 includes an electrically conductive probe 46, the tip of which extends into the flow channel 35 of the hot melt solution. The flow channel 35 is electrically conductive as are the slug 39 and the spring 42. The channel 35 is connected to an electrical ground, and the probe 46 is inserted through the wall of the channel 35 inside a suitable electrically insulating fluid seal 47.

The control system 44 further includes a resistor 48 coupled between a voltage source $+V$ and the probe 46. The side of the resistor 48 connected to the probe 46 is also coupled to an electrically controlled valve 49, such as a solenoid valve, embodying the valve 24 of FIG. 1 in the gas line. When the slug 39 contacts the probe 46, the probe is electrically grounded through a circuit path including the slug 39, the spring 42, and the conduit 35. When the slug 39 is not in contact with the probe 46, the probe is at a potential established by the voltage source $+V$, and this voltage is coupled to the solenoid valve.

In operation, when the gas content of the adhesive and gas solution is below a selected maximum level, the slug 39 is spaced apart from the probe 46, and voltage is applied to the solenoid valve 49. The solenoid valve 49 is in turn activated by the applied voltage to an open condition wherein gas is coupled from the gas source 22 to the gear pump 11. Once the gas content of the solution has risen to the selected level, the slug 39 moves upwardly, into contact with the probe 46, grounding the probe and removing the applied voltage from the solenoid valve 49. The valve then closes, stopping the flow of gas from the gas source to the pump.

As the adhesive and gas solution is dispensed through the valve 32 of the gun 28 (FIG. 1), the gas content of the solution decreases due to the introduction of raw hot melt adhesive from the hot melt source 17 into the system. Even in the absence of operation of the gun 28, due to gas leakage the gas content of the solution decreases. When the gas content of the adhesive and gas solution has decreased sufficiently to increase the pressure drop across the slug 39, the slug moves downwardly out of contact with the probe, and the solenoid valve 49 is again activated to add gas to the solution. The sensor 38 and the control system 44 shown in FIG. 2 consequently serve as a closed loop servo control to maintain a desired gas concentration in the adhesive and gas solution of the hot melt system 10.

A further improvement in the control technique may be obtained if the position of the slug is sensed continuously. In this case, a measure of the slug position is used to control the gas content of the solution on a continuous basis, such as through the use of a proportional controller. In implementing such a control system, it can be shown that the pressure differential across the slug 39 is related to the mass flow rate m' of the hot melt solution through the conduit 35, and the viscosity u of the adhesive and gas solution, by the following expression:

$$P_1 - P_2 = K m' u \tag{1}$$

Figures 6, 7:
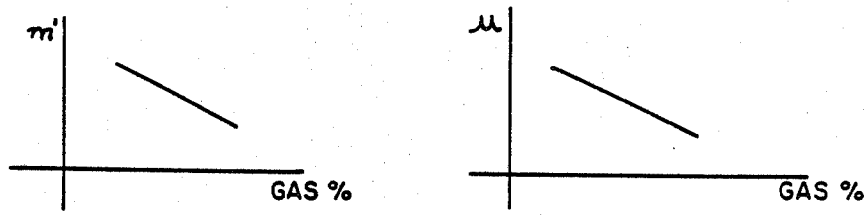
FIG. 6 is an idealized graphical representation of the relationship between hot melt solution flow rate and the percentage of gas in the hot melt adhesive and gas solution.
FIG. 7 is an idealized graphical representation of the relationship between the hot melt viscosity and the percentage of gas in the hot melt adhesive and gas solution.

In this expression, K is a constant of proportionality, and $P_1 - P_2$ is the pressure drop across the slug 39. As shown in idealized form in FIGS. 6 and 7, the mass flow rate m' and the viscosity u, such as are sensed by a differential pressure sensor in the conduit 35, each decrease as the percentage of gas in the adhesive and gas solution increases. Consequently, viewing the relationship of Equation 1, since the pressure differential is proportional to the product of m' and u, the differential pressure also decreases as the percentage of gas in the solution increases. The differential pressure across the slug 39 is also related to the slug position by the following expression:

$$P_1 - P_2 = kx/A \qquad (2)$$

In Equation 2, k is the spring constant of the spring 42, A is the cross-sectional area of the conduit, and x is the displacement of the slug in a direction to compress the spring, measured from the point at which the slug is in contact with the spring but before the spring is compressed. In practicing the present control technique, the term "A" is, as stated, the cross-sectional area of the conduit. In theory, for greater precision than is presently required, the term "A" would represent an area slightly less than the cross-sectional area of the conduit due to fluid flow between the slug and the conduit wall.

The position of the slug may therefore be related to the flow rate m' and the viscosity u of the solution, and hence to the percentage of gas in the solution, by the expression:

$$x = (K/k) A m' u \qquad (3)$$

Therefore, if means are provided to monitor the slug position x, a signal indicative of this position can be used to control the flow rate of the gas from the gas surce 22 to the gear pump 11 in the system 10 of FIG. 1.

An illustrative system for accomplishing such control is shown in FIG. 3. In FIG. 3, the conduit 35, the slug 39, the orifice 41 in the slug, the spring 42, and the spring stop 43 are present as in the sensor arrangement 40 of FIG. 2. However, in FIG. 3, the differential pressure sensor 50 includes a pick-up coil 51 wrapped around, and electrically insulated from, the conduit 35, with a tap and the ends of the coil 51 being electrically connected to a slug position sensing circuit 52. A variety of sensing circuits 52 may be employed, typically including circuitry which produces a slug position signal based upon inductance variations in the coil 51. The inductance of the coil 51 changes in dependence upon the position of the slug 39, which acts as a movable "core" for the coil. Exemplary magnetic core position sensing arrangements for use in fluid flow measurement are shown, for example, in U.S. Pat. Nos. 2,936,614 to Godbey and 3,931,737 to Conkling et al. Alternatively, the position of the slug 39 could be determined by optical or capacitive pick-ups or the like.

In the control arrangement illustrated in FIG. 3, the actual slug position signal developed by the slug position sensing circuit 52 is coupled on a line 53 to a gas valve control circuit 54. The gas valve control circuit 54 also receives a desired slug position signal, such as from a potentiometer or switch setting. This desired slug position setting is selected by the system operator based upon a trial run of the hot melt system wherein an acceptable quality foamed hot melt adhesive is dispensed at that setting. The gas valve control circuit 54 then controls the solenoid valve 49 to regulate the input of gas from the gas source 22 to the pump 11 a the hot melt system operates, whether the adhesive dispensing gun valve is open or closed.

The control system 50 is shown in the form of a servo control diagram in FIG. 4. The gas valve control circuit 54 comprises a summing junction and a controller which operates the gas valve 49. The response of the system to the gas from the gas valve 49 is represented by the transfer function 55. As the actual position x of the slug 39 varies from the desired position, the control circuit 54 regulates the flow of gas through the gas valve 49 to return the slug to the desired position.

In implementing the control systems of FIGS. 2 and 3, it is necessary to maintain the temperature of the hot melt adhesive solution and the speed of the pump constant. In this way, variations in flow rate and viscosity are substantially due only to variations in the gas content of the adhesive and gas solution. In some cases, it may be desired to operate the pump at different speeds, such as in running the hot melt system 10 in a gear-to-line mode. In a gear-to-line mode, the pump is operated at a speed related to the speed of movement of substrates past the dispensing gun, which speed varies. If the pump speed is varied, the amount of shear work performed on the hot melt adhesive material varies, and this in turn causes variations in the temperature of the material.

With reference to the pressure differential sensor 50 of FIG. 3, for example, and assuming Hagen-Pouselle flow through the slug 39, the differential pressure may be stated as:

$$P_1 - P_2 = (8uLm')/(aR^2) \qquad (4)$$

In this expression, u is the viscosity of the adhesive and gas solution, L is the length of the slug 39, m' is the mass flow rate of the solution, a is the effective cross sectional area of the orifice 41 of the slug 39, and R is the radius of the orifice 41. The pressure differential across the slug 39 is also equal to the spring force divided by the effective area upon which the pressure works:

$$P_1 - P_2 = (kx)/A \qquad (5)$$

In Equation 5, as in the earlier Equations 2 and 3, k is the spring constant of the spring 42, A is the cross-sectional area of the conduit, and x is the displacement of the slug 39 from a position in which the slug is in contact with the spring and the spring is uncompressed.

For a material having a constant percentage of gas, the pump output is proportional to the pump speed:

$$m' = Bw \qquad (6)$$

In Equation 6, B is a proportionality constant and w is the angular rotational speed of the pump.

The viscosity-temperature dependence of the adhesive and gas solution may be represented as:

$$u = u_o e^{-b(T-T_o)}, \qquad (7)$$

where $u_o$ and $T_o$ are representative of a base condition of viscosity and temperature, and b is a proportionality constant.

Combining Equations 4, 5, 6, and 7 yields the following expression:

$$x = [(8LABu_o)/(aR^2k)]we^{-b(T-T_o)} \qquad (8)$$

In Equation 8, the terms within brackets comprise hardware parameters (L, A, R, k and a), a process parameter (B), and a material parameter ($u_o$). For a given hardware/material configuration, the parameters within the brackets remain substantially constant. Therefore, the slug position x as a function of temperature and pump speed may be expressed as follows:

$$x(w,T) = [x(w_o,T_o)/w_o][w][e^{-b(T-T_o)}] \quad (9)$$

In Equation 9, $x(w_o,T_o)$ is the slug position at a reference or "teaching" condition of temperature and pump speed. $x(w,T)$ is the "desired" slug position at some other pump speed and temperature.

Equations 8 and 9 may serve as the basis for hypothesizing control algorithms for the gas control loop. In using Equations 8 and 9, the proportionality constant b may be selected at a nominal value for the particular adhesive employed or as an approximation for the different types of adhesives which might be used. The proportionality constant b may also be calculated by measuring the slug position, temperature, and pump speed at a second "teaching" condition. Equation 9 may then be solved for b by inserting the observed values of x, w and T at the second "teaching" condition of the hot melt system.

Figure 5:
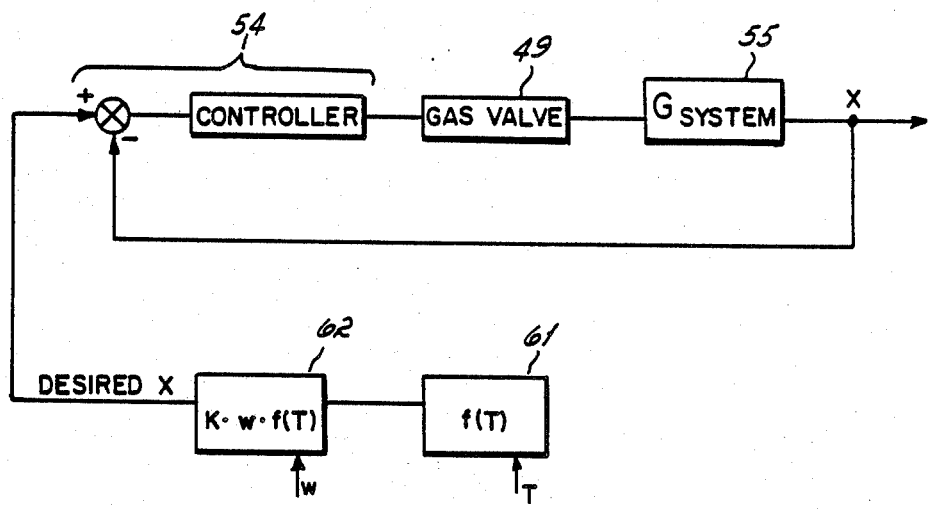
FIG. 5 is a diagrammatic illustration of an alternative control loop for the system of FIG. 1.

As shown in FIG. 5, a closed loop servo control which implements Equations 8 and 9 includes a control circuit 54, a gas valve 49, and a system transfer characteristic 55 similar to that shown in FIG. 4. In the system illustrated in the diagram of FIG. 5, however, instead of inputting a selected desired slug position x to the control circuit 54, circuits 61 and 62 implement Equations 8 and 9 to vary the "desired" x dependent upon system conditions.

The first bracketed term of Equation 9 may be designated M, established from the "teaching" condition of the system, and the third bracketed term of Equation 9, the viscosity-temperature dependence term, may be designated f(T). In this case, Equation 9 then becomes:

$$x(w,T) = Mwf(T) \quad (10)$$

As shown in FIG. 5, the temperature of the adhesive and gas solution, which may be measured, for example, at the gun 28, is input to the circuit 61 and f(T) determined therefrom. This value is coupled to the circuit 62, which also receives a measure of the pump speed w. In the block 62, the constant K (stored in the circuit 62 from a "teaching" run of the system) is multiplied by the measured pump speed w and the temperature term f(T) to produce the desired slug position signal x. The control circuit 54 uses this "desired" slug position, and the "actual" slug position, to control the gas valve 49 in a manner to maintain the actual slug position equal to the instantaneously calculated desired slug position.

The functions of the control circuit 54 and of the circuits 61 and 62 may be combined, for example, in a single microprocessor-based control circuit. After an operator sets up one or more "teaching" conditions for the system, the sets of data at these conditions are used for calculating the constant terms stored for the desired slug position calculation. The processor-based control circuit thereafter monitors the adhesive and gas solution temperature and pump speed to continuously adjust the desired value of the slug position x over a range of pump speeds and temperatures in the hot melt adhesive dispensing system. In like manner, other system variables not related to the gas content of the hot melt solution may be accommodated by appropriate adjustment of the desired slug position value.

With reference to FIGS. 8 and 9 a gas concentration sensor utilizing infrared (IR) absorption technology is seen to include a split block 70 of substantial thermal mass, such as steel, containing a sample flow path for a single phase liquid solution of carbon dioxide gas dissolved in molten adhesive. The sample flow path includes an inlet port 72, an outlet port 74, and an intermediate sample flow region 76, to be described in more detail hereafter, connected between the inlet and outlet ports. The split block 70 includes separable block sections 70a and 70b in which the inlet ports 72 and 74 are formed, respectively. Inlet block 70a includes a conical infrared radiation inlet cavity 78, while the split block 70b includes an infrared radiation outlet cavity 80. Cavities 78 and 80 at their inner ends connect to confronting circular bores 82 and 84. Located within the bores 82 and 84 are infrared transmissive windows 86 and 88, respectively, fabricated of suitable material such as calcium flouride. An annular shim 87 having a thickness in the approximate range of 0.005–0.010 inches is disposed between the confronting surfaces 70a' and 70b', respectively, of the split blocks 70a and 70b, respectively. Assuming the confronting surfaces of the windows 86 and 88 are flush with the surfaces 70a' and 70b', which is preferred, a space is nprovided between the confronting surfaces of the windows,ddefining the intermediate flow region 76, having a thickness equal to the thickness of the shim.

The substantially single phase solution of ga dissolved in the heated molten adhesive is input to the inlet port 72 from the pump outlet (not shown in FIG. 8) via a suitable conduit 90 whereupon it flows through a circular bore 72a into an elongated cavity 72b having an approximately square cross section. The cavity 72b is formed by an elongated triangular cross-section cavity section 72b' formed in the surface 70a' of split block 70a and an elongated triangular cross-section cavity 72b" formed in the surface 70b' of split block 70b. Cavity 72b' and cavity 72b" are in confronting relationship to each other such that they collectively define the square cross-section elongated cavity 72b. Cavity 72b communicates with the internal flow region 76 located between the confronting surfaces of the infrared transmissive cylindrical windows 86 and 88. Also communicating with the internal flow region 76 is a second elongated cavity 74b having a generally square cross section comprising confronting elongated triangular cross-section cavities 74b' and 74b" formed in surfaces 70a' and 70b' of split blocks 70a and 70b. The square cross-section elongated cavity 74b communicates with a circular bore 74a formed in block 70b which in turn communicates with outlet port 74.

As a consequence of the foregoing construction, the single phase solution of dissolved gas in the molten adhesive entering inlet port 72 via conduit 90 exits the outlet port 74 to a suitable outlet conduit 94 and ultimately a dispenser via a path which includes circular bore 72a, square cross-section elongated cavity 72b, intermediate flow region 76 a portion of which is between windows 86 and 88, elongated square cross-section cavity 74b, and the circular bore 74a. In the course of flowing through the sample flow path described, a portion of the flow, namely, that portion of the intermediate flow region co-extensive with the circular cross-sectional area between confronting circular surfaces of the cylindrical windows 86 and 88, is subjected to infrared radiation from a suitable source 98. In a preferred form, the infrared radiation source 98 is a resistive coil through which an electrical current is passed of a magnitude sufficient to heat the coil to a point whereat it emits infrared radiation of relatively constant intensity. The infrared radiation from the source 98, shown schematically by the arrow 100, passes through window 86 and irradiates the dissolved gas/molten adhesive single phase liquid solution in that portion of the intermediate flow region 76 located between windows 86 and 88. The infrared radiation from the source 98 which is not absorbed by the windows 86 and 88 and the dissolved gas/molten adhesive single phase solution in intermediate flow region 76 exits the split block 70, as shown schematically by the arrow 102. Of course, it is understood that the difference between the incident radiation 100 and the exit radiation 102 is not solely attributable to radiation absorbed by the dissolved gas/molten adhesive single phase solution flowing in region 76 since the IR transmissive windows 86 and 88 are not 100% transmissive to infrared radiation, but do absorb a rather small percent of the radiation from the source 98 directed along the radiation path described above. However, the amount of radiation absorbed by the windows 86 and 88 can be ignored since this does not vary significantly and can therefore be zeroed out or otherwise electrically compensated for such that changes in the percent of incident radiation 100 that emerges at 102 can be attributed to absorption by the dissolved gas/molten adhesive single phase solution flowing in region 76.

To maintain the heated adhesive input to the split block 70 via conduit 90 in a molten condition while flowing through the sample flow path in block 70, a heater 104 is wrapped around the perimeter of the split block. The heater 104 heats the block 70 to a temperature necessary to maintain the dissolved gas/molten adhesive single phase solution at the desired temperature to thereby avoid cooling it.

To detect the infrared radiation 102 that has passed through the IR path in the split block 70 across which the single phase solution flows in sample flow region 76, a suitable IR detector 110, such as a lead selenide photoconductor, is provided. The emerging radiation 102 passes through a circular tube 112 to a suitable IR lens 110a which focuses the radiation on the active element (not shown) of the detector 110, providing an electrical output on line 114 correlated to the radiation incident on the detector.

To render the sensor insensitive to changes in the intensity of the IR emitter 98, aging of the photoconductive detector 110, and other such changes of a gradual nature, an IR dual filter wheel assembly 118 is provided. The filter wheel assembly 118 includes a disc 120 opaque to infrared radiation which is mounted for rotation on a shaft 122 journaled in a stationary journal mount 124. The disc 120 has a toothed perimeter which is driven by a suitable pinion 126 mounted to the end of a motor shaft 128 of a stationarily mounted motor 130, preferably at approximately 300 RPM. The disc 120 is provided with a pair of apertures 120a and 120b which are fitted with suitable narrow pass band IR filters 132 and 134. One of the filters, such as filter 132, passes a narrow band of infrared radiation which is highly absorbed by the gas foaming constituent of the dissolved gas/molten adhesive single phase liquid solution being monitored, but not significantly absorbed by the molten adhesive. For example, if the foaming gas is carbon dioxide, the filter 132 passes substantially only radiation in the 4.3 micron wavelength region corresponding to the absorption band of carbon dioxide. The filter 134, which is a narrow pass band reference filter, passes radiation in a narrow reference band which is substantially unabsorbed by the gas component and preferably not significantly absorbed by the molten adhesive and preferably close to the absorbed band. If the gas is carbon dioxide and the adhesive is a conventional polyethylenebased hot melt adhesive such as EASTABOND A-3 manufactured by Eastman Chemical Co. having a viscosity of 2200 CPS at 350° F., the reference filter 134 can be selected to pass substantially only radiation in the 4.5 micron wavelength region.

Figure 13:
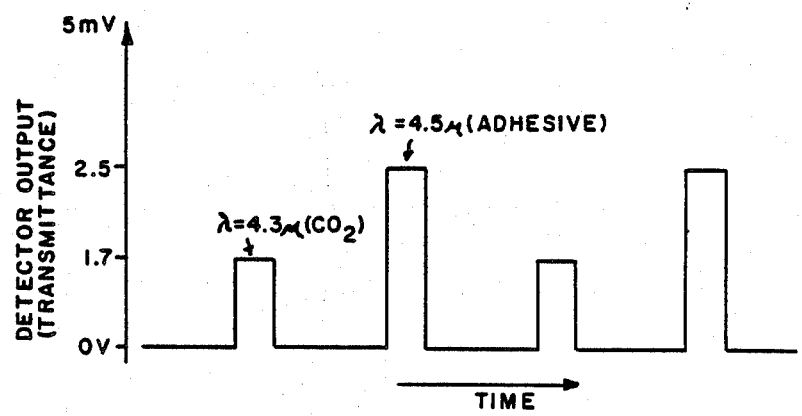
FIG. 13 is a idealized plot of the output of an infrared detector (transmittance) vs. time for a sensor of the type shown in FIGS. 8 and 9 when used to monitor the dissolved concentration of carbon dioxide in molten adhesive for a single phase solution having a foam ratio of approximately 1.5.

In operation the IR filter wheel assembly 118 alternately passes to the detector 110 radiation passing through filters 132 and 134 as these filters alternately pass in front of lens 110a at the rate of once per revolution of the disc 120. When neither filter 132 nor filter 134 overlies lens 110a, the IR-opaque disc 120 is interposed between the lens 110a and the tube 112, blocking the transmission of radiation 102 to the detector 110. The detector 110 is preferably substantially equally sensitive to radiation passed by lenses 132 and 134, and under the circumstances described provides an electrical output on line 114 as shown in FIG. 13. The amplitude of the smaller pulses is correlated to the transmittance of the 4.3 micron wavelength IR radiation through th sample, with the amplitude decreasing as the $CO_2$ concentration increases. The amplitude of larger pulses is correlated to the transmittance of the 4.5 micron reference IR wavelength through the sample, with the amplitude being substantially independent of $CO_2$ concentration in the dissolved gas/molten adhesive single phase liquid solution.

The split block 70, infrared radiation source 98, filter assembly wheel 98, and detector 110 are encased in a suitable housing 140, which is preferably purged with nitrogen gas to avoid interference from atmospheric carbon dioxide. An insulative shield 141 surrounds the tube 112 to protect the filters and detector from heat from the block 70.

To avoid leakage of the highly pressurized dissolved gas/molten adhesive solution, which may have a pressure of 1500 psi or more, O-rings 95 and 96 located in suitably provided grooves in surfaces 70a' and 70b' of split blocks 70a and 70b are provided on either side of the shim 87 along with suitable clamp means (not shown) designed to clamp the split blocks 70a and 70b in sandwiching relation to the shim 87 to compress the O-rings 95 and 96. Additionally, O-rings 92 and 93 are provided around the windows 86 and 88. To further minimize leakage of the highly pressurized gas/adhesive liquid solution being monitored, the annular space between the cylindrical perimeter of the windows 86 and 88 and the circular bores 82 and 84 are filled with a suitable sealant 105 and 106, such as room temperature vulcanizable silicone, which forms a temperature and fluid resistant resilient seal between the windows 86 and 88 and the bores 82 and 84. An advantage of the sealant 105 and 106, particularly the resilient nature thereof, is that it accommodates differing thermal expansion coefficients of the split blocks 70a and 70b and the windows 86 and 88, preventing damage to the windows when the split block is subjected to heating and cooling cycles. Located between the outer surfaces of the windows 86 and 88 and annular shoulders 135 and 136 of bores 82 and 84 are annular brass washers 137 and 138, respectively, which afford some cushioning for the windows when the pressurized solution is flowing in sample flow region 76.

Figure 9A:
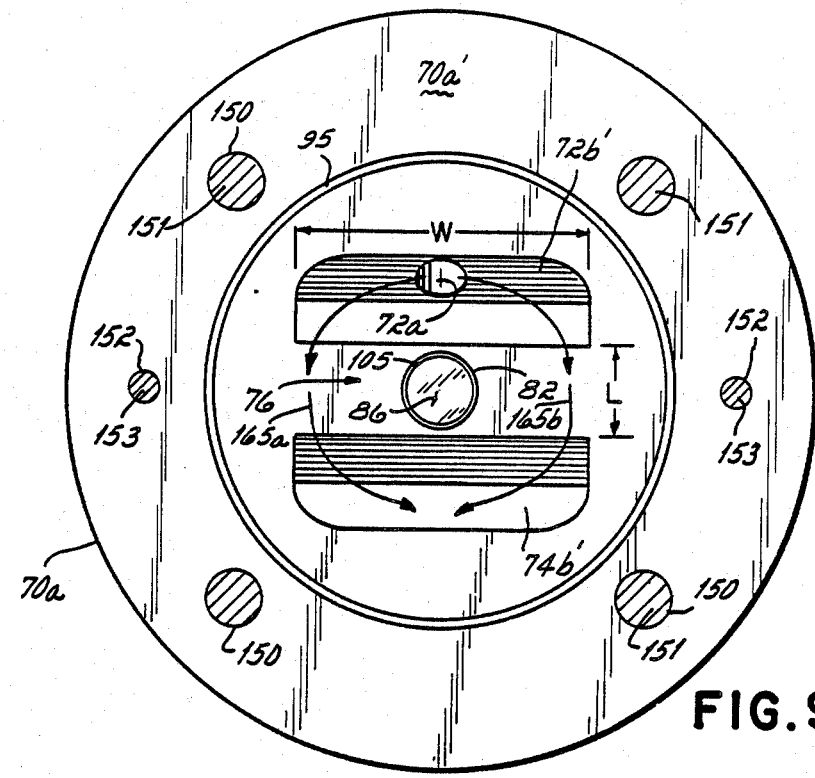
FIG. 9A is a cross-sectional view along line 9A—9A of FIG. 8.
Figure 9B:
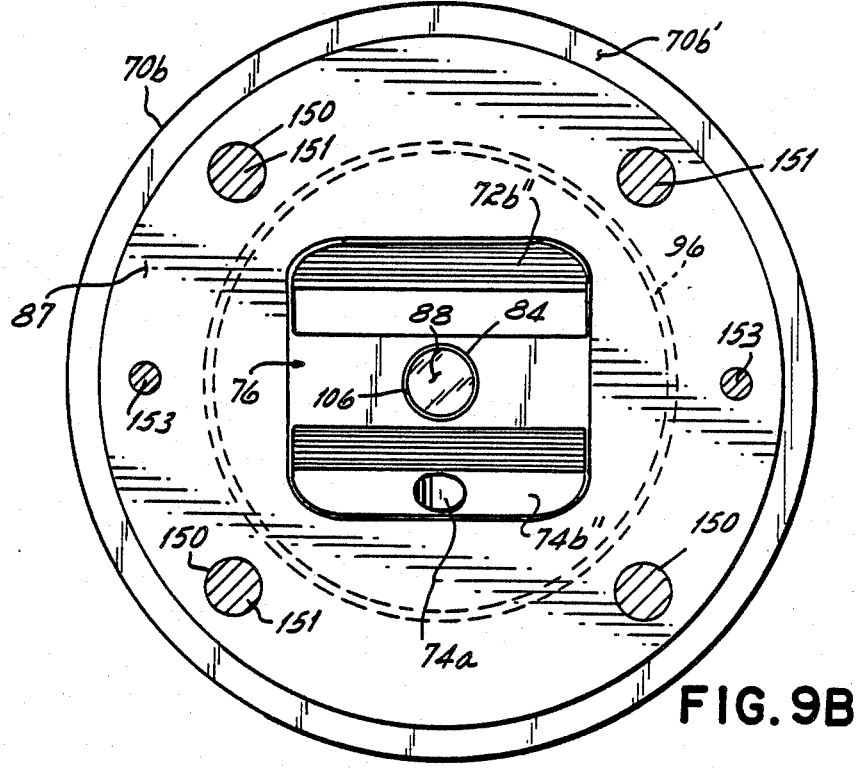
FIG. 9B is a cross-sectional view along line 9B—9B of FIG. 8.

As shown in FIGS. 9A and 9B, suitable bolt holes 150 are provided in split blocks 70a and 70b for accommodating bolts 151 used for clamping the split blocks 70a and 70b together. To assure proper angular orientation of the split blocks 70a and 70b relative to each other, alignment holes 152 are provided in split block 70a opposite suitably positioned alignment holes 152 in split block 70b for accommodating alignment pins 153.

By virtue of the fact that the region of minimum flow cross section of the intermediate flow region 76 has a substantial transverse width W (FIGS. 9A and 9B) due to the elongated nature of the cavities 72b and 74b, wherein W=2.0" in a preferred form, and a rather small length L, e.g., L=0.6", the pressure drop between bores 72a and 74a is relatively small, e.g. 50 psi, at an input liquid pressure in conduit 90 of 1500 psi.

To maximize the signal-to-noise ratio the thickness of the intermediate flow region 76 between the confronting surfaces of the windows 86 and 88 has been selected to be relatively small, such as in the approximate range of 0.005–0.010 inches, as noted earlier. In this manner a substantial portion of the incident radiation 100 at the reference wavelength corresponding to filter 134 emerges at 102 after passing through the dissolved gas/molten adhesive single phase liquid under test which flows in intermediate flow region 76.

By reason of locating the windows 86 and 88 at the approximate midpoint of the width W of the sample flow region 76, the portion of the sample flow through which IR is transmitted is at the center of the sample flow path, thereby measuring the fastest flowing portion of the sample which enhances response time to changes in gas concentration in the adhesive.

Figure 10:
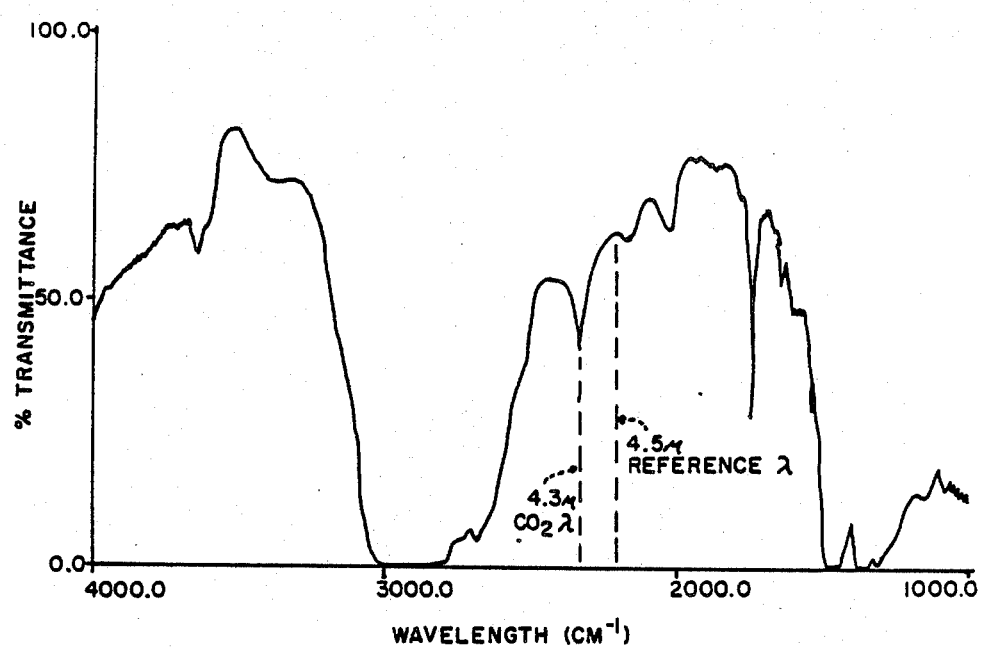
FIG. 10 is a plot of infrared transmittance vs. radiation wavelength for an unfoamed molten adhesive containing substantially no gas.

FIG. 10 depicts the spectrum of a suitable IR source after passing through the windows 86 and 88 when a molten adhesive is flowing through the region 76 of a type which is in a nonfoamed state, that is, does not include gas dissolved in the pressurized molten adhesive liquid. With reference to FIG. 10, which is a plot of transmittance vs. wavelength, it is noted that there is an absorption line at 4.3 microns which is heavily absorbed by carbon dioxide gas and substantially unabsorbed by the adhesive, and a reference absorption line at 4.5 microns which is not significantly absorbed by carbon dioxide gas or by the adhesive.

Figure 11:
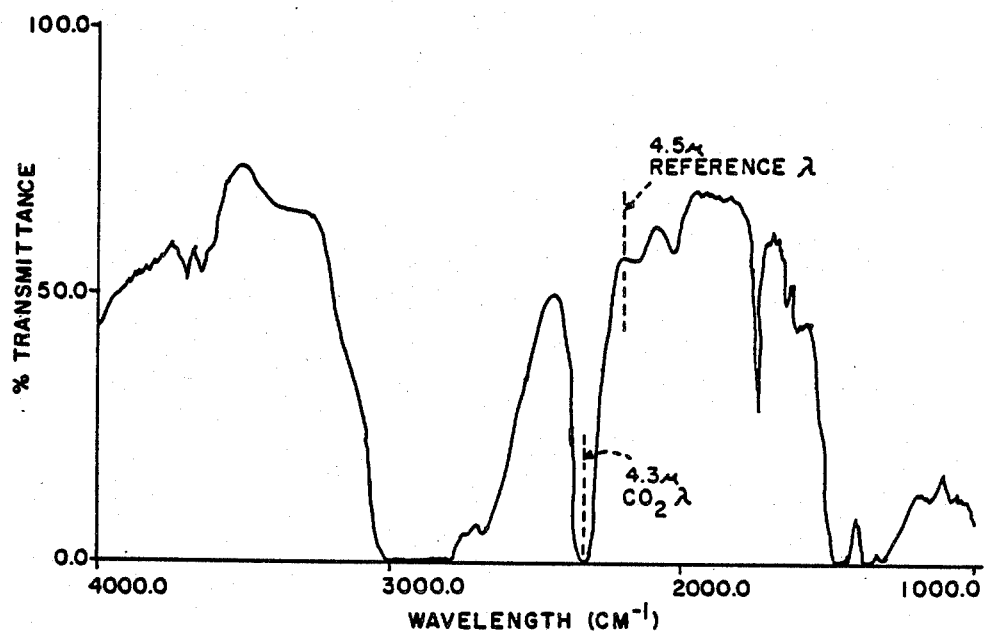
FIG. 11 is a plot of infrared transmittance vs. radiation wavelength for a substantially single phase liquid solution of carbon dioxide dissolved in molten adhesive.

With reference to FIG. 11, a similar IR spectrum is shown for the same adhesive having substantial carbon dioxide gas dissolved in the single phase molten adhesive liquid solution for the purpose of rendering it highly foamed when applied to a suitable substrate at ambient pressure. It is noted that the transmittance at 4.5 microns for the highly foamable hot melt (FIG. 11) is not substantially changed with respect to that shown for the nonfoaming hot melt (FIG. 10). However, very substantial absorption has occurred at 4.3 microns due to the presence of substantial dissolved carbon dioxide gas in the highly pressurized molten adhesive liquid.

With reference to FIG. 13, a plot of IR detector output on detector output line 114 vs. time is shown for a moderately foamable hot melt adhesive. As is apparent, pulses of approximately 1.7 millivolts and 2.5 millivolts are alternately provided, corresponding to the alternate passage of the 4.3 micron and 4.5 micron filters 132 and 134 in front of the detector lens 110a. The magnitude of the detector output pulses corresponding to radiation of 4.3 microns and 4.5 microns incident on detector 110 corresponds to the relative transmittance of infrared radiation at the gas component absorption wavelength of 4.3 microns and the reference wavelength of 4.5 microns, respectively. By monitoring the ratio of the amplitude of the pulse attributable to the reference wavelength transmittance and the amplitude of the pulse attributable to the gas component wavelength transmittance, which is known in the industry as the foam ratio, a measure of the foamability of the dissolved gas/molten adhesive single phase liquid solution can be provided. The relationship of foam ratio ($F_R$) to the transmittance ($T_R$) of the reference IR wavelength (4.5 microns), and the transmittance ($T_g$) of the gas absorption IR wavelength (4.3 microns) is:

$$F_R = e^{\frac{(T_R/T_g) - A}{B}}$$

where A and B are experimentally determined constants. Using closed loop servo techniques the concentration of the gas dissolved in the pressurized molten adhesive liquid can be continuously adjusted to maintain the concentration of gas dissolved in the pressurized single phase molten adhesive liquid gas/solution at the desired level to assure uniform foamability of the adhesive when applied to a substrate at substantially ambient pressure conditions.

By virtue of utilizing a split block 70 of substantial thermal mass, the split block heats up and cools down slowly, preventing sudden changes in temperature at the interface between the IR windows 86 and 88 and the block bores 82 and 84, thereby minimizing problems occasioned by the differing coefficients of thermal expansion of the material from which the windows are formed and the material from which the split block 70 is formed.

Figure 12:
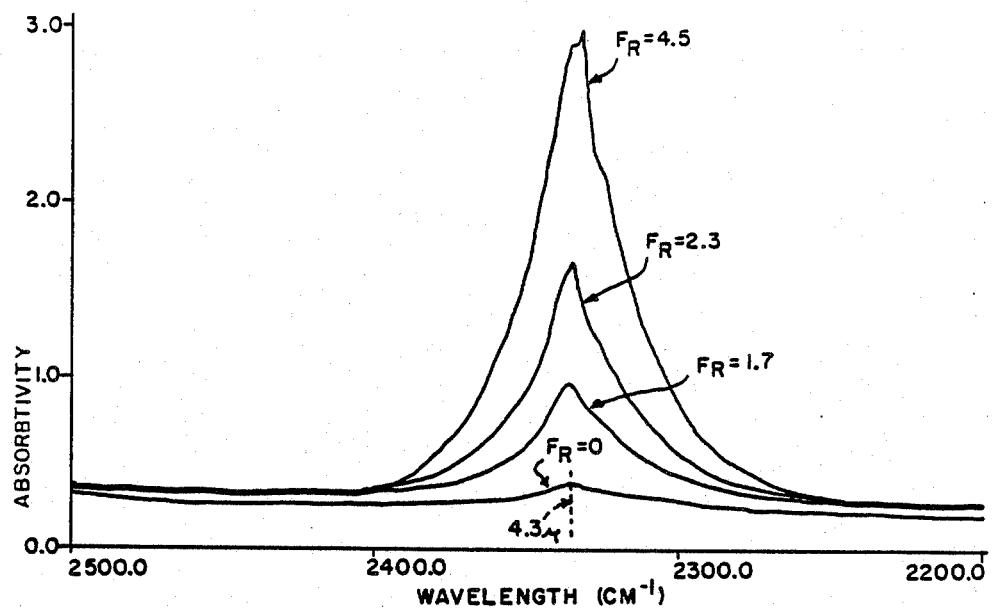
FIG. 12 is a plot of IR absorbtivity vs. radiation wavelength for single phase liquid solutions of carbon dioxide gas dissolved in molten adhesive having different dissolved gas concentrations, and thus different foam ratios.

FIG. 12 is a plot of foam ratio $F_R$ vs. wavelength for foamable adhesives having foam ratios of $F_R=1.7$, $F_R=2.3$, and $F_R=4.5$, as well as for a nonfoaming adhesive ($F_R=0$). Note that the transmittance for the three foamable adhesives has a substantial peak at a wavelength of 4.3 microns, whereas at this same wavelength the nonfoaming adhesive has a very small peak. As noted earlier, as the content of the foaming gas, such as carbon dioxide, is increased, the foam ratio measured at the 4.3 micron wavelength line corresponding to the absorption line for carbon dioxide, increases. By monitoring the foam ratio at the wavelength of maximum absorption by the gas, a measure of the concentration of the gas dissolved in the pressurized molten adhesive liquid is obtained, enabling the gas concentration to be accurately controlled.

The sensors of FIGS. 2, 3, and 8 and 9 facilitate the measurement of a parameter of the dissolved gas/pressurized molten adhesive single phase liquid solution which is correlated to the concentration of the gas dissolved in the substantially single phase solution, but which is substantially independent of the concentration of the molten adhesive in the substantially single phase solution. In the one preferred embodiment of FIGS. 8 and 9, the sensor detects radiation transmitted through the single phase dissolved gas/molten adhesive liquid solution. Alternatively, radiation reflected from the single phase liquid solution could be measured in accordance with well known (a) cylindrical internal reflection (CIR) technology, such as available from Combustion Engineering Inc., Process Analytics, Lewisburg, W. Va., (b) fiber optic probe technology available from Guided Wave, Inc., El Dorado Hills, Calif., and (c) on-stream internally reflecting cylinder technology available from General Analysis Corp., Darien, Conn. Sensors capable of making the foregoing measurement other than those specifically described herein can be used without departing from the spirit and scope of the invention. For example, sensors operating on the following principles can be used:

1. Vapor pressure using semipermeable membrane;
2. Dielectric response (capacitance) at an a.c. frequency selected for maximum sensitivity;
3. Ultrasonic techniques, including sound attenuation and capacitative sensing of transient cavitation; and
4. Semiconductor conductivity.

What is claimed is:

1. Apparatus for controlling the gas content of dispensed hot melt thermoplastic adhesive foam comprising:
   means for supplying heated thermoplastic adhesive material in a molten state at an outlet;
   means for supplying gas at an outlet;
   means, coupled to the adhesive material supplying means outlet and to the gas supplying means outlet, for agitating and pressurizing the molten adhesive material in the presence of the gas to force the gas into solution with the molten adhesive material to form a substantially single phase liquid of unfoamed molten adhesive and gas in solution at an outlet, whereby a dispenser may be coupled to the outlet of the agitating and pressurizing means for dispensing the molten adhesive and gas solution at a reduced pressure so that the gas is released from solution and forms a dispensed adhesive foam;
   means for sensing a parameter of said substantially single phase liquid of molten adhesive and gas in solution while said solution is in said substantially single liquid phase, unfoamed state, said parameter being correlated to the dissolved gas content of said substantially single phase liquid solution for producing an output dependent upon said sensed parameter; and
   means, coupled to the parameter sensing means and to the gas supplying means, for controlling the flow of gas from the gas supplying means to the agitating and pressurizing means dependent upon said parameter sensing means output.

2. The apparatus of claim 1 in which the agitating and pressurizing means has an inlet coupled to the adhesive material supplying means outlet, and further comprising a recirculation path coupling the outlet of the agitating and pressurizing means to the inlet of the agitating and pressurizing means.

3. The apparatus of claim 2 which further comprises means for reducing the pressure in the recirculation path between the outlet of the agitating and pressurizing means and the inlet of the agitating and pressurizing means such that a substantial fraction of the gas is no longer dissolved in the molten adhesive.

4. The apparatus of claim 3 in which the agitating and pressurizing means comprises a pump operable to pump volumetrically metered amounts of molten adhesive material and molten adhesive and gas solution from the inlet to the outlet of the agitating and pressurizing means and in which the parameter sensing means comprises means for sensing a parameter at least partially dependent upon the flow rate of the adhesive and gas solution from said outlet.

5. The apparatus of claim 4 in which the parameter sensing means comprises means for sensing a parameter dependent upon both the flow rate and the viscosity of the molten adhesive and gas solution formed at the outlet of the agitating and pressurizing means.

6. The apparatus of claim 5 in which the parameter sensing means comprises means for sensing a pressure differential across a restrictor along a flow path coupled from the molten adhesive and gas solution outlet of the agitating and pressurizing means.

7. The apparatus of claim 1 wherein said sensing means includes a source of infrared radiation having a specified wavelength substantially absorbed by said gas and substantially unabsorbed by said adhesive material, and detecting means for sensing radiation at said specified wavelength, said source directing said radiation into said substantially single phase unfoamed molten adhesive and gas solution and said detecting means sensing said radiation emerging from said substantially single phase unfoamed molten adhesive and gas solution.

8. The apparatus of claim 7 wherein said sensing means further includes sampling means defining a sample flow path for passing a sample of said substantially single phase unfoamed molten adhesive and gas solution between said infrared radiation source and said detecting means, said sampling means comprising:
   a body having inlet and outlet ports between which is connected an intermediate sample flow region, said intermediate sample flow region having a cross-sectional flow area defined by a width and by a height which is substantially smaller than said width to minimize the pressure drop across said intermediate sample flow region, said inlet and outlet ports and said intermediate sample flow region collectively comprising said sample flow path,
   said infrared radiation source passing infrared radiation along a radiation path through said intermediate sample flow path to said detecting means in a direction approximately parallel to said height thereof to maximize transmission of infrared radiation from said source through said intermediate sample flow region to said detecting means.

9. The apparatus of claim 8 wherein said radiation path through said intermediate sample flow region has a width measured parallel to said width of said intermediate sample flow region cross-sectional area which is substantially less than, and approximately centered relative to, said width of said intermediate sample flow region cross-sectional area to minimize sampling errors due to effects at the edge of said intermediate sample flow region.

10. The apparatus of claim 8 wherein said sampling means further comprises:
   a heater for heating said body to a temperature approximating the temperature of said molten adhesive material output from said adhesive supply means, and
   first and second windows of solid state material transmissive to said infrared radiation located within said body along said radiation path on opposite sides of, and adjacent to, said intermediate sample flow region,
   said body having a substantial thermal mass to avoid rapid temperature changes adjacent said first and second radiation windows to minimize the risk of subjecting said windows to thermal shock.

11. The apparatus of claim 10 wherein said windows and said body have significantly different coefficients of thermal expansion, said apparatus further comprising:
a layer of resilient sealant mounting said windows within said body to resiliently mount said windows in sealed relation to said body to accommodate thermally-induced dimensional changes between said body and windows and seal said windows relative to said body to prevent the flow therebetween of said solution from said intermediate sample flow region.

12. Apparatus for dispensing hot melt thermoplastic adhesive foam having a controlled gas content comprising:
a heated thermoplastic adhesive material supply container providing molten adhesive material at an outlet;
means for supplying gas at an outlet;
means, coupled to the outlet of the adhesive material supply and to the outlet of the gas supply, for agitating and pressurizing the molten adhesive material in the presence of the gas to force the gas into solution with molten adhesive material to form substantially single phase liquid of unfoamed molten adhesive and gas in solution at an outlet;
means, coupled to the outlet of the agitating and pressurizing means, for dispensing the molten adhesive and gas solution at a reduced pressure whereby the gas is released from solution and forms a dispensed adhesive foam;
means for sensing a parameter of said substantially single phase liquid of molten adhesive and gas in solution while said solution is in said substantially single liquid phase, unfoamed state, said parameter being correlated to the dissolved gas content of said substantially single phase liquid solution for producing an output dependent upon said sensed parameters; and
means, coupled to the parameter sensing means and coupled between the gas supply outlet and the agitating and pressurizing means, for controlling the flow of gas which is coupled to the agitating and pressurizing means dependent upon said parameter sensing means output.

13. The apparatus of claim 12 in which the agitating and pressurizing means has an inlet coupled to the adhesive material supply outlet, and further comprising a recirculation path coupling the outlet of the agitating and pressurizing means to the inlet of the agitating and pressurizing means.

14. The apparatus of claim 13 which further comprises means for reducing the pressure in the recirculation path between the outlet of the agitating and pressurizing means and the inlet of the agitating and pressurizing means such that a substantial fraction of the gas is no longer dissolved in the molten adhesive.

15. The apparatus of claim 14 in which the agitating and pressurizing means comprises a pump operable to pump volumetrically metered amounts of molten adhesive material and molten adhesive and gas solution from the inlet to the outlet of the agitating and pressurizing means and in which the parameter sensing means comprises means for sensing a parameter at least partially dependent upon the flow rate of the adhesive and gas solution from said outlet.

16. The apparatus of claim 15 in which the parameter sensing means comprises means for sensing a parameter dependent upon both the flow rate and the viscosity of the molten adhesive and gas solution formed at the outlet of the agitating and pressurizing means.

17. The apparatus of claim 16 in which the parameter sensing means comprises means for sensing a pressure differential across a restrictor along a flow path coupled from the molten adhesive and gas solution outlet of the agitating and pressurizing means.

18. The apparatus of claim 12 wherein said sensing means includes a source of infrared radiation having a specified wavelength substantially absorbed by said gas and substantially unabsorbed by said adhesive material, and detecting means for sensing radiation at said specified wavelength, said source directing said radiation into said substantially single phase unfoamed molten adhesive and gas solution and said detecting means sensing said radiation emerging from said substantially single phase unfoamed molten adhesive and gas solution.

19. Apparatus for controlling the gas content of dispensed hot melt thermoplastic adhesive foam comprising:
means for supplying heated thermoplastic adhesive material in a molten state at an outlet;
means for supplying gas at an outlet;
means, coupled to the adhesive material supplying means outlet and to the gas supplying means outlet, for agitating and pressurizing the molten adhesive material in the presence of the gas to force the gas into solution with the molten adhesive material to form a substantially single phase unfoamed molten adhesive and gas solution at an outlet, whereby a dispenser may be coupled to the outlet of the agitating and pressurizing means for dispensing the molten adhesive and gas solution at a reduced pressure so that the gas is released from solution and forms a dispensed adhesive foam;
means for sensing a differential pressure across a restrictor along a flow path of the substantially single phase unfoamed molten adhesive and gas solution and for producing an output dependent upon said sensed differential pressure; and
means, coupled to the differential pressure sensing means and to the gas supplying means, for controlling the flow of gas from the gas supplying means to the agitating and pressurizing means dependent upon said differential pressure sensing means output.

20. The apparatus of claim 19 in which the differential pressure sensing means comprises (a) a movable slug having an orifice therethrough positioned in a flow path of the molten adhesive and gas solution and (b) means for producing said differential pressure sensing means output dependent upon the position of the slug in the flow path.

21. The apparatus of claim 20 in which the controlling means comprises means for comparing the output of the differential pressure sensing means, indicative of the slug position, to a desired slug position and for controlling the gas supplying means to couple gas to the agitating and pressurizing means dependent upon said comparison.

22. The apparatus of claim 21 in which the agitating and pressurizing means comprises a variable speed pump, and further comprising means, coupled to the controlling means, for calculating a desired slug position dependent upon the pump speed.

23. The apparatus of claim 22 in which the desired slug position calculating means calculates a desired slug position which is also dependent upon the temperature of the molten adhesive and gas solution.

24. Apparatus for controlling the gas content of dispensed thermosplastic adhesive foam comprising:
means for supplying heated thermoplastic adhesive material in a molten state at an outlet;
means for supplying gas at an outlet;
means, coupled to the adhesive material supplying means outlet and to the gas supplying means outlet, for agitating and pressurizing the molten adhesive material in the presence of the gas to force the gas into solution with the molten adhesive material to form substantially single phase liquid of unfoamed molten adhesive and gas in solution at an outlet, whereby a dispenser may be coupled to the outlet of the agitating and pressurizing means for dispensing the molten adhesive and gas solution at a reduced pressure, so that the gas is released from solution and forms a dispensed adhesive foam;
means for sensing a parameter of said substantially single phase liquid of molten adhesive and gas in solution while said solution is in said substantially single liquid phase, unfoamed state, said parameter being correlated to the dissolved gas content of said substantially single phase liquid solution for producing an output dependent upon said sensed parameter; and
means, coupled to the parameter sensing means, for comparing the parameter sensing means output with a desired parameter input to produce a comparison signal; and
means, coupled to the comparing means and to the gas supplying means, for controlling the flow of gas from the gas supplying means to the agitating and pressurizing means dependent upon said comparison signal.

25. The apparatus of claim 24 in which the parameter sensing means comprises differential pressure sensing means including (a) a movable slug having an orifice therethrough positioned in a flow path of the molten adhesive and gas solution and (b) means for producing a differential pressure sensing means output dependent upon the position of the slug in the flow path.

26. The apparatus of claim 25 in which the comparing means compares the output of the differential pressure sensing means, indicative of the slug position, with a desired slug position and the controlling means controls the flow of gas to the agitating and pressurizing means dependent upon said comparison.

27. The apparatus of claim 26 in which the agitating and pressurizing means comprises a variable speed pump, and further comprising means, coupled to the comparing means, for calculating a desired slug position dependent upon the pump speed.

28. The apparatus of claim 27 in which the desired slug position calculating means calculates a desired slug position which is also dependent upon the temperature of the molten adhesive and gas solution.

29. The apparatus of claim 24 wherein said sensing means includes a source of infrared radiation having a specified wavelength substantially absorbed by said gas and substantially unabsorbed by said adhesive material, and detecting means for sensing radiation at said specified wavelength, said source directing said radiation into said substantially single phase unfoamed molten adhesive and gas solution and said detecting means sensing said radiation emerging from said substantially single phase unfoamed molten adhesive and gas solution.

30. A method for dispensing hot melt thermoplastic adhesive foam having a controlled gas content comprising the steps of:
agitating and pressurizing heated thermoplastic adhesive material in a molten state in the presence of a gas to force the gas into solution with the molten adhesive material to form a substantially single phase liquid of unfoamed molten adhesive and gas in solution;
sensing a parameter of said substantially single phase liquid of molten adhesive and gas in solution while said solution is in said substantially single liquid phase, unfoamed state, said parameter being correlated to the dissolved gas content of said substantially single phase liquid solution for producing an output dependent upon said sensed parameter;
controlling the flow of said gas into the gas and adhesive material solution dependent upon said sensed parameter; and
dispensing the molten adhesive and gas solution at a reduced pressure so that gas is released from solution and forms a dispensed adhesive foam.

31. The method of claim 30 which further comprises, after said agitating and pressurizing step, the step of:
recirculating at least a portion of the molten adhesive and gas solution for mixing with the heated solid thermoplastic adhesive material in a molten state.

32. The method of claim 31 in which said sensing step comprises sensing a differential pressure across a restriction along a flow path of the molten adhesive and gas solution.

33. The method of claim 31 in which said controlling step comprises the substeps of:
comparing said sensed parameter to a setpoint parameter to produce a comparison signal; and
controlling the gas flow dependent upon said comparison.

34. The method of claim 33 which further comprises, before said comparing and controlling substeps, the step of:
calculating a setpoint parameter to accommodate system variables which are substantially independent from the gas content of the molten adhesive and gas solution.

35. The method of claim 30 wherein said sensing step includes:
irradiating said substantially single phase unfoamed molten adhesive and gas solution with infrared radiation having a specified wavelength substantially absorbed by said gas and substantially unabsorbed by said adhesive material, and
detecting radiation at said specified wavelength emerging from said substantially single phase unfoamed molten adhesive and gas solution.

36. An apparatus for controlling the gas content of dispensed hot melt thermoplastic adhesive foam comprising:
means for supplying heated thermoplastic adhesive material in a molten state in an outlet;
means for supplying gas at an outlet;
a positive displacement pump having a first inlet coupled to the adhesive material supplying means outlet and having a second inlet coupled to the gas supplying means outlet, for agitating and pressurizing the molten adhesive material in the presence of the gas to force the gas into solution with the molten adhesive material to form a substantially single phase liquid of unfoamed molten adhesive and gas in solution at a pump outlet, whereby a dispenser may be coupled to the pump outlet for dispensing the molten adhesive and gas solution at a reduces pressure, so that the gas is released from solution and forms a dispensed adhesive foam;

means for recirculating the molten adhesive and gas solution from the pump outlet to the first pump inlet;

means for sensing a parameter of said substantially single phase liquid of molten adhesive and gas in solution while said solution is in said substantially single liquid phase, unfoamed state, said parameter being correlated to the dissolved gas content of said substantially single phase liquid solution for producing an output dependent upon said sensed parameter; and means, coupled to the parameter sensing means and to the gas supplying means, for controlling the flow of gas from the gas supplying means to the second inlet of the pump dependent upon said parameter sensing means output.

37. The apparatus of claim 36 in which the positive displacement pump comprises a two-stage gear pump and in which the first inlet of the pump is an inlet to the first gear pump stage and in which the second inlet of the pump is an inlet between the first and second stages of the gear pump.

38. The apparatus of claim 37 in which the means for recirculating the molten adhesive and gas solution from the pump outlet to the first pump inlet includes means for supplying the recirculated solution to the first pump inlet at a pressure substantially reduced from the pressure of the solution at the pump outlet such that a substantial fraction of the gas is no longer dissolved in the molten adhesive.

39. The apparatus of claim 36 wherein said sensing means includes a source of infrared radiation having a specified wavelength substantially absorbed by said gas and substantially unabsorbed by said adhesive material, and detecting means for sensing radiation at said specified wavelength, said source directing said radiation into said substantially single phase unfoamed molten adhesive and gas solution and said detecting means sensing said radiation emerging from said substantially single phase unfoamed molten adhesive and gas solution.

40. Apparatus for controlling the gas content of dispensed thermoplastic adhesive foam comprising:

means for supplying heated thermoplastic adhesive material in a molten state at an outlet;

means for supplying gas at an outlet;

means, coupled to the adhesive material supplying means outlet and to the gas supplying means outlet, for agitating and pressurizing the molten adhesive material in the presence of the gas to force the gas into solution with the molten adhesive material to form substantially single phase liquid of unfoamedd molten adhesive and gas in solution at an outlet, whereby a dispenser may be coupled to the outlet of the agitating and pressurizing means for dispensing the molten adhesive and gas solution at a reduced pressure, so that the gas is released from solution and forms a dispensed adhesive foam;

means for sensing a parameter of said substantially single phase liquid of unfoamed molten adhesive and gas in solution which is correlated to the dissolved gas content of said substantially single phase liquid solution and for producing an output dependent upon said sensed parameter, said parameter sensing means comprising differential pressure sensing means including (a) a movable slug having an orifice therethrough positioned in a flow path of said substantially single phase liquid of molten adhesive and gas in solution and (b) means for producing a differential pressure sensing means output dependent upon the position of the slug in the flow path;

means, coupled to the parameter sensing means, for comparing the parameter sensing output with a desired parameter input to produce a comparison signal; and means, coupled to the comparing means and to the gas supplying means, for controlling the flow of gas from the gas supplying means to the agitating and pressurizing means dependent upon said comparison signal.

41. The apparatus of claim 40 in which the comparing means compares the output of the differential pressure sensing means, indicative of the slug position, with a desired slug position and the controlling means controls the flow of gas to the agitating and pressurizing means dependent upon said comparison.

42. The apparatus of claim 41 in which the agitating and pressurizing means comprises a variable speed pump, and further comprising means, coupled to the comparing means, for calculating a desired slug position dependent upon the pump speed.

43. The apparatus of claim 42 in which the desires slug position calculating means calculates a desired slug position which is also dependent upon the temperature of the molten adhesive and gas solution.

44. Apparatus for controlling the gas content of dispensed hot melt thermoplastic adhesive foam comprising:

means for supplying heated thermoplastic adhesive material in a molten state at an outlet;

means for supplying gas at an outlet;

means, coupled to the adhesive material supplying means outlet and to the gas supplying means outlet, for agitating and pressurizing the molten adhesive material in the presence of the gas to force the gas into solution with the molten adhesive material to form a substantially single phase liquid of unfoamed molten adhesive and gas in solution at an outlet, whereby a dispenser may be coupled to the outlet of the agitating and pressurizing means for dispensing the molten adhesive and gas solution at a reduced pressure so that the gas is released from solution and forms a dispensed adhesive foam;

means for sensing a parameter of said substantially single phase liquid of unfoamed molten adhesive and gas in solution which is correlated to the dissolved gas content of said substantially single phase liquid solution for producing an output dependent upon said sensed parameter, said sensing means including a source of infrared radiation having a specified wavelength substantially absorbed by said gas and substantially unabsorbed by said adhesive material, and detecting means for sensing radiation at said specified wavelength, said source directing said radiation into said substantially single phase liquid of unfoamed molten adhesive and gas in solution and said detecting means sensing said radiation emerging from said substantially single phase liquid of unfoamed molten adhesive and gas in solution; and means, coupled to the parameter sensing means and to the gas supplying means, for controlling the flow of gas from the gas supplying means to the agitating and pressurizing means dependent upon said parameter sensing means output.

45. Apparatus for dispensing hot melt thermoplastic adhesive foam having a controlled gas content comprising:

a heated thermoplastic adhesive material supply container providing molten adhesive material at an outlet;

means for supplying gas at an outlet;

means, coupled to the outlet of the adhesive material supply and to the outlet of the gas supply, for agitating and pressurizing the molten adhesive material in the presence of the gas to force the gas into solution with molten adhesive material to form substantially single phase liquid of unfoamed molten adhesive and gas in solution at an outlet;

means, coupled to the outlet of agitating and pressurizing means, for dispensing the molten adhesive and gas solution at a reduced pressure whereby the gas is released from solution and forms a dispensed adhesive foam;

means for sensing a parameter of said substantially single phase liquid of unfoamed molten adhesive and gas in solution which is correlated to the dissolved gas content of said substantially single phase liquid solution for producing an output dependent upon said sensed parameter, said sensing means including a source of infrared radiation having a specified wavelength substantially absorbed by said gas and substantially unabsorbed by said adhesive material, and detecting means for sensing radiation at said specified wavelength, said source directing said radiation into said substantially single phase liquid of unfoamed molten adhesive and gas in solution and said detecting means sensing radiation emerging from said substantially single phase liquid of unfoamed molten adhesive and gas in solution; and means, coupled to the parameter sensing means and coupled between the gas supply outlet and the agitating and pressurizing means, for controlling the flow of gas which is coupled to the agitating and pressurizing means dependent upon said parameter sensing means output.

46. Apparatus for controlling the gas content of dispensed thermoplastic adhesive foam comprising:

means for supplying heated thermoplastic adhesive material in a molten state at an outlet;

means for supplying gas at an outlet;

means, coupled to the adhesive material supplying means outlet and to the gas supplying means outlet, for agitating and pressurizing the molten adhesive material in the presence of the gas to force the gas into solution with the molten adhesive material to form a substantially single phase liquid of unfoamed molten adhesive and gas in solution at an outlet, whereby a dispenser may be coupled to the outlet of the agitating and pressuring means for dispensing the molten adhesive and gas solution at a reduced pressure so that the gas is released from solution and forms a dispensed adhesive foam;

means for sensing a parameter of said substantially single phase liquid of unfoamed molten adhesive and gas in solution which is correlated to the dissolved gas content of said substantially single phase liquid solution for producing an output dependent upon said sensed parameter, said sensing means including a source of infrared radiation having a specified wavelength substantially absorbed by said gas and substantially unabsorbed by said adhesive material, and detecting means for sensing radiation at said specified wavelength, said source directing said radiation into said substantially single phase liquid of unfoamed molten adhesive and gas in solution and said detecting means sensing said radiation emerging from said substantially single phase liquid of unfoamed molten adhesive and gas in solution;

means, coupled to the parameter sensing means, for comparing the parameter sensing means output with a desired parameter input to produce a comparison signal; and means, coupled to the comparing means and to the gas supplying means, for controlling the flow of gas from the gas supplying means to the agitating and pressurizing means dependent upon said comparison signal.

47. An apparatus for controlling the gas content of dispensed hot melt thermoplastic adhesive foam comprising:

means for supplying heated thermoplastic adhesive material in a molten state in an outlet;

means for supplying gas at an outlet;

a positive displacement pump having a first inlet coupled to the adhesive material supplying means outlet and having a second inlet coupled to the gas supplying means outlet, for agitating and pressurizing the molten adhesive material in the presence of the gas to force the gas into solution with the molten adhesive material to form a substantially single phase liquid of unfoamed molten adhesive and gas in solution at a pump outlet, whereby a dispenser may be coupled to the pump outlet for dispensing the molten adhesive and gas solution at a reduced pressure, so that the gas is released from solution and forms a dispensed adhesive foam;

means for recirculating the molten adhesive and gas solution from the pump outlet to the first pump inlet;

means for sensing a parameter of said substantially single phase liquid of unfoamed molten adhesive and gas in solution which is correlated to the dissolved gas content of said substantially single phase liquid solution for producing an output dependent upon said sensed parameter, said sensing means including a source of infrared radiation having a specified wavelength substantially absorbed by said gas and substantially unabsorbed by said adhesive material, and detecting means for sensing radiation at said specified wavelength, said source directing said radiation into said substantially single phase liquid of unfoamed molten adhesive and gas in solution and said detecting means sensing said radiation emerging from said substantially single phase liquid of unfoamed molten adhesive and gas in solution; and means, coupled to the parameter sensing means and to the gas supplying means, for controlliing the flow of gas from the gas supplying means to the second inlet of the pump dependent upon said parameter sensing means output.

48. A method for dispensing hot melt thermoplastic adhesive foam having a controlled gas content comprising the steps of:
  agitating and pressurizing heated thermoplastic adhesive material in a molten state in the presence of a gas to force the gas into solution with the molten adhesive material to form a substantially single phase liquid of unfoamed molten adhesive and gas in solution;
  sensing a parameter of said substantially single phase liquid of unfoamed molten adhesive and gas in solution which is correlated to the dissolved gas content of said substantially single phase liquid solution for producing an output dependent upon said sensed parameter, said sensing step including:
  irradiating said substantially single phase liquid solution of unfoamed molten adhesive and gas in solution with infrared radiation having a specified wavelength substantially absorbed by said gas and substantially unabsorbed by said adhesive material, and
  detecting radiation at said specified wavelength emerging from said substantially single phase liquid of unfoamed molten adhesive and gas in solution;
  controlling the flow of said gas into the gas and adhesive material solution dependent upon said sensed parameter; and
  dispensing the molten adhesive and gas solution at a reduced pressure so that the gas is released from solution and forms a dispensed adhesive foam.

* * * * *

UNITED STATES PATENT AND TRADEMARK OFFICE
CERTIFICATE OF CORRECTION

PATENT NO. : 4,779,762
DATED : October 25, 1988
INVENTOR(S) : Richard G. Klein et al It is certified that error appears in the above-identified patent and that said Letters Patent is hereby corrected as shown below:

Col. 6, line 36, "measued" should be -- measured --.

Col. 11, line 68, "a" should be -- as --.

Col. 14, line 27, "nprovided" should be -- provided --.

Col. 14, line 28, "ddefining" should be -- defining --.

Col. 14, lin3 32, "ga" should be -- gas --.

Col. 16, line 30, "th" should be -- the --.

Col. 25, line 8, "reduces" should be -- reduced --.

Col. 25, line 62, "unfoamedd" should be -- unfoamed --.

Signed and Sealed this

Tenth Day of October, 1989

Attest:

DONALD J. QUIGG

Attesting Officer

Commissioner of Patents and Trademarks